United States Patent Office

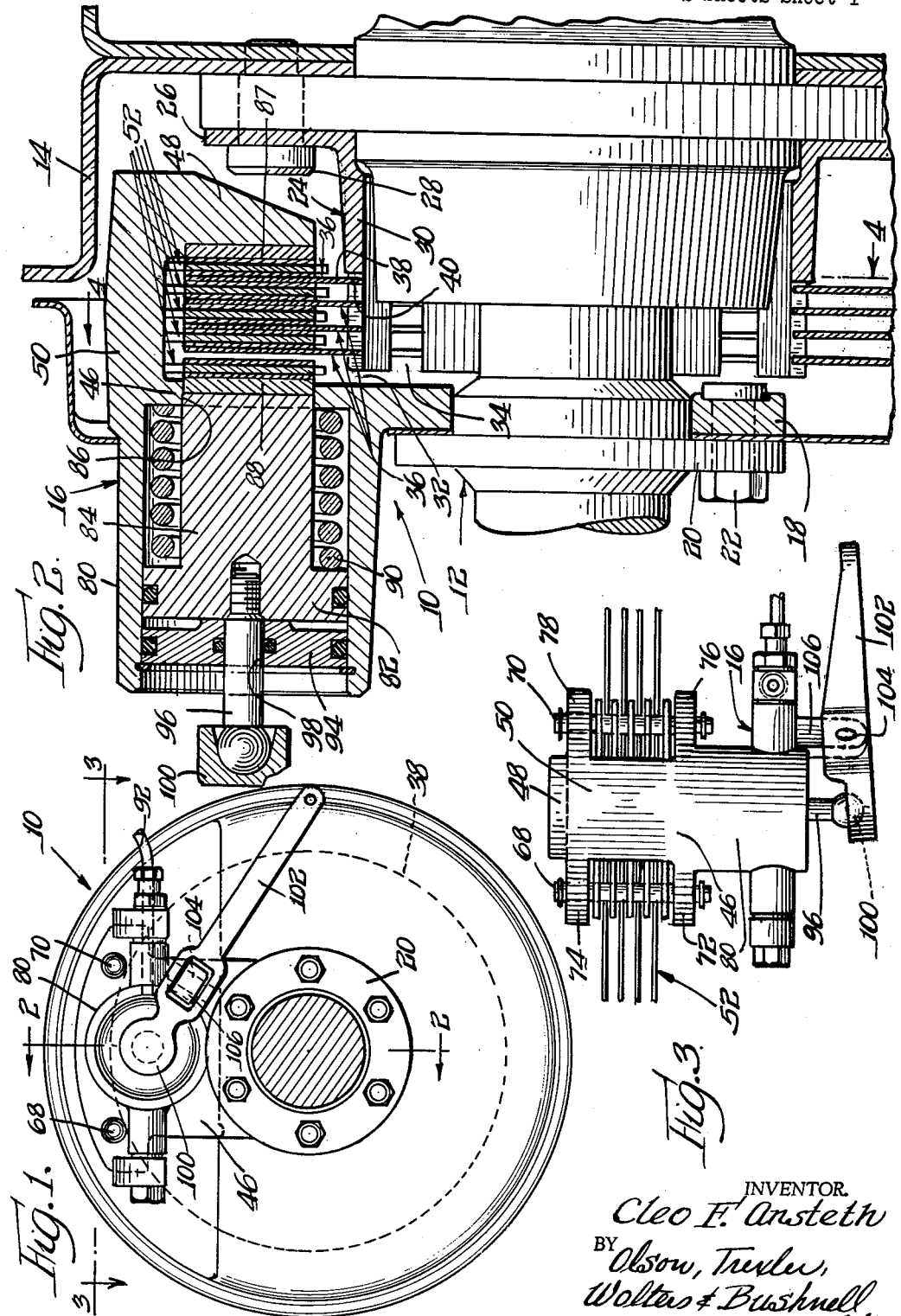

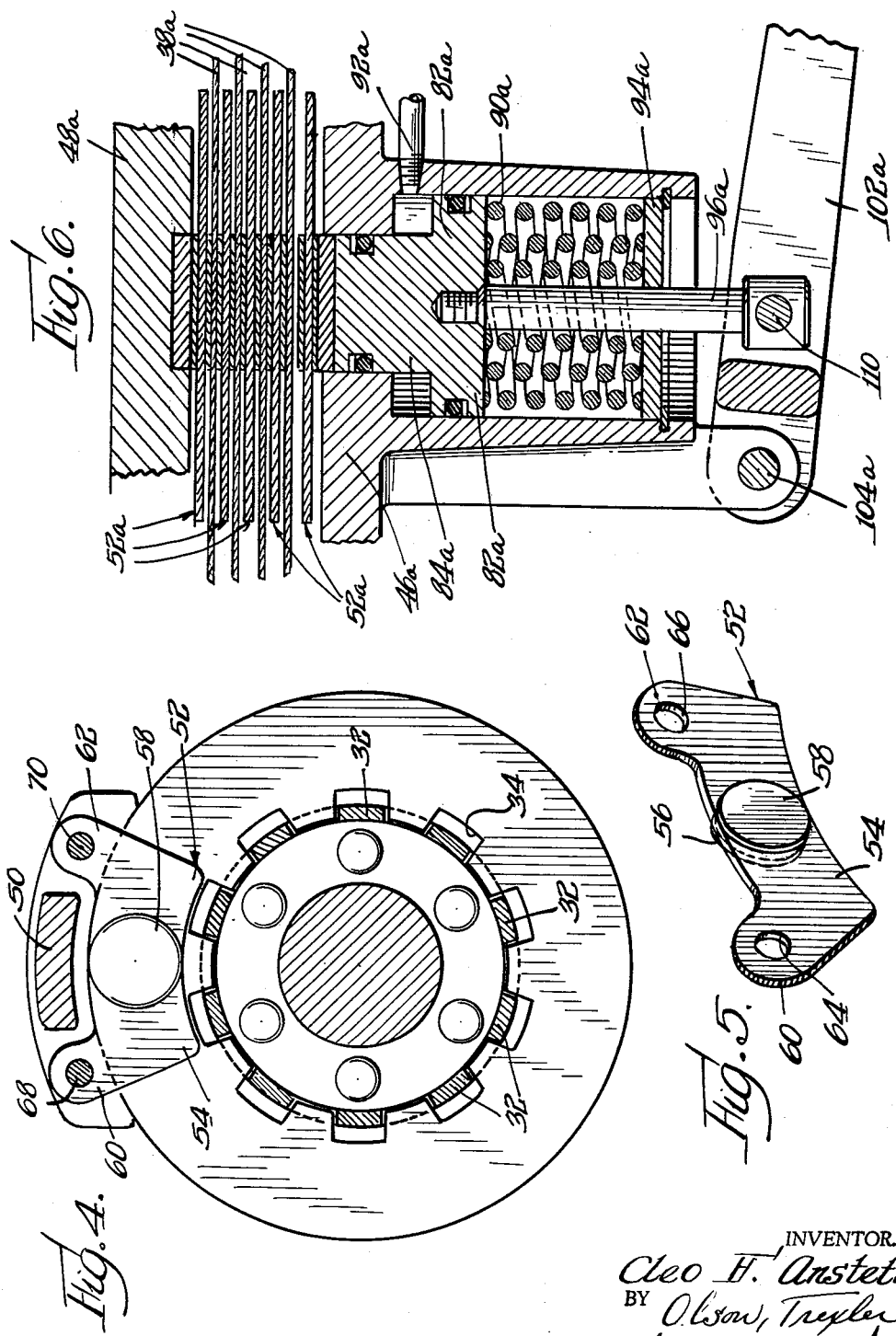

3,132,724
Patented May 12, 1964

3,132,724
AXIALLY MOVABLE, RIM GRIP SPRING APPLIED, FLUID RELEASED SPOT BRAKE WITH ADDITIONAL RELEASE MEANS MANUALLY ACTUATED
Cleo F. Ansteth, Benton Harbor, Mich., assignor, by mesne assignments, to Lambert Brake Corporation, St. Joseph, Mich., a corporation of Michigan
Filed Apr. 13, 1962, Ser. No. 187,328
2 Claims. (Cl. 188—73)

The present invention relates to a novel brake structure, and more specifically to a novel brake unit especially suitable for use in relatively small vehicles, trailers, industrial trucks, and the like.

An important object of the present invention is to provide a novel compact and highly efficient disc-type brake structure which may be readily installed on a variety of vehicles.

A further object of the present invention is to provide a novel brake unit utilizing one or more rotor discs and one or more stator friction elements constructed and arranged for promoting air cooling of the unit and efficient braking action.

Still another object of the present invention is to provide a novel brake unit of the above described type with simplified and effective actuating means which may be operated mechanically or with fluid under pressure.

A still further specific object of the present invention is to provide a novel brake unit of the above described type wherein the actuating means may be readily modified so that the unit is either normally energized and manually released or normally released and manually energized.

Other objects and advantages of the present invention will become apparent from the following description and the accompanying drawings, wherein:

FIG. 1 is an elevational view of a brake unit incorporating features of the present invention;

FIG. 2 is an enlarged fragmentary sectional view taken along line 2—2 in FIG. 1 and showing the unit installed;

FIG. 3 is an enlarged fragmentary sectional view taken along line 3—3 in FIG. 1;

FIG. 4 is a sectional view taken along line 4—4 in FIG. 2;

FIG. 5 is a perspective view showing a friction element of the brake structure; and FIG. 6 is a fragmentary sectional view showing a slightly modified form of the present invention.

Referring now more specifically to the drawings, wherein like parts are designated by the same numerals throughout the various figures, a brake unit 10 incorporating features of the present invention is adapted to be assembled with an axle 12 of a vehicle for controlling a wheel 14 which is rotatably mounted on the axle in a known manner, as shown in FIG. 2. In the embodiment shown for the purpose of illustrating the present invention, the unit 10 comprises a fixed frame member 16 having a hub portion 18 suitably secured to a flange 20 of the vehicle by a plurality of fastening devices 22. The frame member 16 is adapted to support stator friction means and actuating means, as will be described in detail below.

An adaptor or driver 24 is secured to and rotates with the wheel 14. As shown in FIG. 2, the driver is provided with a radially extending end flange 26 which is secured to the wheel by a plurality of screws or fasteners 28. The driver also comprises an axially extending cylindrical portion 30 which is splined so as to present a plurality of circumferentially spaced, axially extending, finger portions 32 which are separated by slots 34.

Rotor discs 36 are mounted on the driver 24 for rotation therewith. Each of the rotor discs comprises an annular member 38 preferably formed from sheet metal and having a splined inner marginal portion 40 interengageable with the finger portions 32 of the driver for rotation therewith while permitting axial sliding movement relative thereto.

As shown in FIG. 2, the frame member 16 includes a generally C-shaped section having opposing leg portions 46 and 48 which embrace the rotor friction discs and are integrally connected by a bight portion 50. Stator friction members 52 shown in FIGS. 2–5 are mounted between the leg portions 46 and 48 and are alternately stacked with the rotor friction discs. Each of the stator friction members comprises an elongated arcuate metal plate 54 having circular buttons 56 and 58 of brake lining or friction material bonded or otherwise secured to opposite sides thereof.

As shown best in FIG. 3, each of the stator plate members 54 is of greater circumferential extent or length than the bight portion 50 of the frame member, and each of the plate members 54 includes upstanding ears 60 and 62 (see FIG. 5) at its opposite ends and extending outwardly of the bight portion 50. The ears 60 and 62, respectively, include central apertures 64 and 66 through which guide and support rods 68 and 70 extend. The rod 68 is mounted between apertured lugs 72 and 74 extending laterally from the leg portions 46 and 48 of the frame member and the guide rod 70 is supported by similar aperture lugs 76 and 78 extending laterally from the opposite side margins of the leg portions 46 and 48. A slip fit is provided between the guide and support rods and the apertured ears of the stator members so as to permit the stator members to slide axially of the rods during operation of the brake unit.

The frame member 16 is provided with a cylinder portion 80 integral with the leg portion 46 of the C-shaped section and axially aligned with the friction or button elements 56 and 58 of the stator members. A piston or plunger 82 is slidably disposed within the cylinder 80 and is provided with a reduced diameter elongated portion 84 adapted to project through an aperture 86 formed in the leg portion 46 for engaging an endmost stator member 52. When the piston 82 is moved toward the right, as viewed in FIG. 2, the rotor and stator friction members will be clamped together and between the piston rod 84 and the frame member leg portion 48 so as to effect a braking action. Preferably a wear pad 87 is fixed on the leg portion 48, and a similar pad 88 is secured to the end of the plunger extension 84.

In this embodiment a compression spring 90 is provided between the enlarged end of the piston 82 and the frame leg portion 46 for resiliently biasing the piston toward the left, as viewed in FIG. 2, and thereby releasing the braking action. In order to actuate the piston toward the right, and thereby energize the brake structure, the cylinder may be connected with a suitable source of actuating fluid under pressure by means of a suitable conduit 92 (FIG. 1). The outer end of the cylinder is, of course, sealed by a suitable end structure 94.

The brake unit is also provided with means for mechanically actuating the piston 82 toward the right, which mechanical means may be provided in place of, but preferably in addition to, the fluid or hydraulic pressure supplying means. More specifically, a push rod 96 slidably extends through a suitable aperture 98 in the end structure of the cylinder and has its inner end connected to the piston 82. An outer end of the push rod 96 is engaged by an end portion 100 of an operating lever 102 which is pivoted intermediate its ends on a pin 104 carried by a lug 106 integral with the frame member 16. As will be understood, the operating lever 102 may be connected with additional actuating linkage or other means, not shown. With the structure shown, the mechanical actuating means may be utilized in the event of a failure in the fluid pressure supply system.

FIG. 6 shows a portion of a slightly modified form of the present invention which is essentially identical to the structure described above as indicated by the application of identical reference numerals with the suffix *a* added to corresponding elements. It is to be understood that this embodiment is identical with the structure described above with the exception of the portion of the actuating means shown which is constructed so that the brake unit is normally energized. More specifically, in this embodiment, the compression spring means 90*a* is disposed between the piston 82*a* and the outer end structure 94*a* for normally yieldably biasing the piston 82*a* upwardly, as viewed in FIG. 6, for energizing the brake unit. Since, in this embodiment, the spring means is used to provide the power for energizing the brake unit, it is contemplated that the spring means 90*a* may include a plurality of concentrically disposed coil springs of different diameters, as shown in FIG. 6, for increasing the actuating force.

In the embodiment shown in FIG. 6, the conduit 92*a*, which is connected with a source of fluid under pressure, extends to a port opening at the inner end of the piston whereby the fluid under pressure may be utilized for shifting the piston downwardly, as viewed in FIG. 6, thereby releasing the brake unit. In addition, mechanical means may be provided for shifting the piston downwardly, which means includes a connecting rod 96*a* secured to the piston and also pivotally connected to an operating lever 102*a*. This embodiment differs in that the outer end of the connecting rod 96*a* is connected to an intermediate portion of the lever 102 by a pin 110, and the lever has an end portion thereof connected with the support pivot pin 104*a* for enabling the lever to be operated for exerting a pull on the connecting rod 96 rather than for pushing the connecting rod as in the preceding embodiment.

While the preferred forms of the present invention have been shown and described herein, it is obvious that many structural details may be changed without departing from the spirit and scope of the appended claims.

The invention is claimed as follows:

1. A brake unit comprising a plurality of rotor disks mounted on a rotatable member for rotation therewith and coaxial with the axis thereof and adapted for axial movement relative to each other, fixed frame means including a generally C-shaped section and opposed leg portions enclosing limited peripheral portions of said rotor disks, a plurality of stator means each including an elongated plate member disposed between said leg portions and between said rotor disks, each plate member having apertures through adjacent opposite ends thereof, spaced parallel guide rods mounted between said leg portions and extending through the apertures in the plate members for slidably supporting the same, said frame means including a cylinder portion connected with one of said leg portions, a reciprocable plunger member disposed within said cylinder portion and projecting therefrom for releasably clamping said rotor disks and said stator means with respect to the leg portion opposite to said cylinder portion, a fluid pressure operable piston within said cylinder portion for urging said plunger away from the rotor disks and stator means for deenergizing the brake unit, a rod extending axially into said cylinder portion through the end thereof opposite from said plunger member and engageable with said piston, mechanical means including a pivoted lever connected with said rod for axially shifting said rod for actuating the piston and plunger member in a direction away from the rotor disks and stator means for deenergizing the brake unit, means pivotally supporting said lever at a location laterally offset from said rod, and compression spring means within said cylinder portion between an outer end of the cylinder portion and said piston for urging the piston and plunger member toward the rotor disks and stator means for energizing the brake unit.

2. A brake unit according to claim 1, wherein the compression spring means comprises a plurality of concentrically disposed compression springs between an outer end of said cylindrical portion and said piston.

References Cited in the file of this patent

UNITED STATES PATENTS

| | | |
|---|---|---|
| 596,097 | Wellman et al. | Dec. 28, 1897 |
| 966,892 | Duval | Aug. 9, 1910 |
| 1,849,584 | Milan | Mar. 15, 1932 |
| 2,656,015 | Lapsley | Oct. 20, 1953 |
| 2,815,104 | DuShane | Dec. 3, 1957 |
| 2,862,581 | Lucien | Dec. 2, 1958 |
| 2,934,174 | Lucien | Apr. 26, 1960 |
| 2,937,722 | Ruet | May 24, 1960 |
| 2,948,359 | Barrett | Aug. 9, 1960 |

FOREIGN PATENTS

| | | |
|---|---|---|
| 1,090,611 | France | Oct. 20, 1954 |
| 717,350 | Great Britain | Oct. 27, 1954 |
| 734,271 | Great Britain | July 27, 1955 |